(12) United States Patent
Maiello (10) Patent No.: US 9,648,850 B1
(45) Date of Patent: May 16, 2017

(54) INTERACTIVE PET GROOMING/PETTING/MASSAGING/TOOL/TOY SYSTEM

(76) Inventor: Michael Maiello, St. Petersburg, FL (US)

( * ) Notice: Subject to any disclaimer, the term of this patent is extended or adjusted under 35 U.S.C. 154(b) by 1036 days.

(21) Appl. No.: 13/373,342

(22) Filed: Nov. 10, 2011

Related U.S. Application Data (60) Provisional application No. 61/456,772, filed on Nov. 15, 2010.

(51) Int. Cl.
*A01K 13/00* (2006.01)

(52) U.S. Cl.
CPC .................... *A01K 13/00* (2013.01)

(58) Field of Classification Search
CPC ....... A01K 13/0002; E03F 9/00; B08B 9/023; A46B 7/00; A46B 7/06; A46B 3/16; A45D 2/48
See application file for complete search history.

(56) References Cited

U.S. PATENT DOCUMENTS

| | | | | |
|---|---|---|---|---|
| 1,138,466 A | * | 5/1915 | Fogarty | A46B 3/16 15/171 |
| 1,270,137 A | * | 6/1918 | Forde | A46B 5/00 15/104.04 |
| 1,492,660 A | * | 5/1924 | Arkus | A46B 9/045 15/167.2 |
| 1,546,322 A | * | 7/1925 | Solary | A45D 19/0008 15/104.5 |
| 1,573,686 A | * | 2/1926 | Donahue | A46B 3/16 300/21 |
| 4,308,634 A | * | 1/1982 | Eisenberg | B44D 3/006 15/104.001 |
| 5,022,350 A | * | 6/1991 | Sequist | A01K 13/002 119/611 |
| D325,472 S | * | 4/1992 | Premack | D4/128 |
| 5,176,156 A | * | 1/1993 | Ashtary | A45D 40/26 132/217 |
| 5,295,278 A | * | 3/1994 | Condon | A46B 5/0012 15/104.04 |
| D403,165 S | * | 12/1998 | Ferrante | D32/42 |
| 7,258,078 B1 | * | 8/2007 | Maiello | A01K 13/002 119/619 |
| 9,314,085 B2 | * | 4/2016 | Hatch | A45D 34/042 |

(Continued)

FOREIGN PATENT DOCUMENTS

| | | | | |
|---|---|---|---|---|
| CN | 202874292 U | * | 4/2013 | A46B 5/00 |
| CN | 202919366 U | * | 5/2013 | A46B 9/04 |

(Continued)

*Primary Examiner* — Monica Williams
*Assistant Examiner* — Michael Wang (57) ABSTRACT

A pivot portion is between a handle portion proximally and a brush portion distally. The brush portion has first and second twisted wires. Each twisted wire has a loop distally and linear ends proximally. The linear ends are coupled to the handle portion. Each loop is arcuate for between 270 and 360 degrees with a common side axis when viewed from the side. Each loop is arcuate for between 90 and 180 degrees with a front axis between the twisted wires when viewed from the front. Each loop is arcuate for between 90 and 180 degrees with parallel top axes spaced laterally from the twisted wires when viewed from above. Each loop has bristles extending radially for 360 degrees from the loop.

11 Claims, 5 Drawing Sheets

(56) References Cited

U.S. PATENT DOCUMENTS

| | | | |
|---|---|---|---|
| 9,326,485 B2 * | 5/2016 | Plummer | A01K 13/001 |
| 2002/0157202 A1 * | 10/2002 | Hartel | A46B 5/0025 |
| | | | 15/167.2 |
| 2009/0276972 A1 * | 11/2009 | Dugan | A46B 7/00 |
| | | | 15/167.2 |
| 2012/0222627 A1 * | 9/2012 | Chura | A01K 13/004 |
| | | | 119/622 |
| 2012/0282008 A1 * | 11/2012 | Geuther | A45D 40/26 |
| | | | 401/122 |
| 2014/0116350 A1 * | 5/2014 | Simmons | A01K 13/002 |
| | | | 119/600 |

FOREIGN PATENT DOCUMENTS

| | | | | |
|---|---|---|---|---|
| GB | 2513907 A | * | 11/2014 | A45D 40/24 |
| JP | EP 1604585 A1 | * | 12/2005 | A45D 2/48 |

* cited by examiner

INTERACTIVE PET GROOMING/PETTING/MASSAGING/TOOL/TOY SYSTEM

BACKGROUND OF THE INVENTION

Related Application

The present invention is based upon U.S. Provisional Patent Application No. 61/456,772 filed Nov. 15, 2010 and is an improvement over the invention of my prior patent, U.S. Pat. No. 7,258,078 issued Aug. 21, 2007, the subject matter of which provisional application and issued patent is incorporated herein by reference.

FIELD OF THE INVENTION

The present invention relates to an interactive pet grooming/petting/massaging/tool/toy system and more particularly pertains to brushing animal extremities and non-extremities, including tails, paws, legs, ears, backs, sides, bellies, jaws, necks, and the like with various portions of the same brush in a safe, convenient and economical manner.

DESCRIPTION OF THE PRIOR ART

The use of pet grooming tools and toy systems of known designs and configurations is known in the prior art. More specifically, pet grooming tools and toy systems of known designs and configurations previously devised and utilized for the purpose of brushing animal extremities and non-extremities, including tails, paws, legs, ears, backs, sides, bellies, jaws necks, and the like with various portions of the same brush in a safe, convenient and economical manner, are known to consist basically of familiar, expected, and obvious structural configurations, notwithstanding the myriad of designs encompassed by the crowded prior art which has been developed for the fulfillment of countless objectives and requirements.

While these devices fulfill their respective, particular objectives and requirements, they do not describe an interactive pet grooming/petting/massaging/tool/toy system that allows brushing animal extremities and non-extremities, including tails, paws, legs, ears, backs, sides, bellies, jaws necks, and the like with various portions of the same brush in a safe, convenient and economical manner.

In this respect, the interactive pet grooming/petting/massaging/tool/toy system according to the present invention substantially departs from the conventional concepts and designs of the prior art, and in doing so provides an apparatus primarily developed for the purpose of brushing animal extremities and non-extremities, including tails, paws, legs, ears, backs, sides, bellies, jaws necks, and the like with various portions of the same brush in a safe, convenient and economical manner.

Therefore, it can be appreciated that there exists a continuing need for a new and improved interactive pet grooming/petting/massaging/tool/toy system which can be used for brushing animal extremities and non-extremities, including tails, paws, legs, ears, backs, sides, bellies, jaws necks, and the like with various portions of the same brush in a safe, convenient and economical manner. In this regard, the present invention substantially fulfills this need.

SUMMARY OF THE INVENTION

In view of the disadvantages inherent in the known types of pet grooming tools and toy systems of known designs and configurations now present in the prior art, the present invention provides an improved interactive pet grooming/petting/massaging/tool/toy system. As such, the general purpose of the present invention, which will be described subsequently in greater detail, is to provide a new and improved interactive pet grooming/petting/massaging/tool/toy system and method which has all the advantages of the prior art and none of the disadvantages.

The interactive pet grooming/petting/massaging/tool/toy system of the present invention is for brushing animal extremities and non-extremities. The extremities include tails, paws, legs, ears and the like. The non-extremities include backs, sides, bellies, jaws, necks and other irregular surfaces. The brushing is done with various portions of the same brush in a safe, convenient and economical manner. Provided are a handle portion proximally, a pivot portion centrally, and a brush portion distally.

The handle portion has similarly configured first and second halves. Each half has a coupling end adapted to couple to the brush portion. Each half also has a gripping end adapted to be gripped by a user for opening and closing and manipulating the brush portion. Each half has an aperture extending centrally there through. The apertures are in axial alignment. Each gripping end also includes a first closed hand ring in an oval shaped. Each gripping end also includes a second closed hand ring in a generally oval shape with a concave portion adjacent to the first closed hand ring.

The pivot portion includes a pivot pin extending through the apertures to guide the gripping ends when oscillated by a user to move the brush portion between an inoperative open orientation and an operative closed orientation. The pivot portion also includes a first locking hole on the first handle portion half and a second locking hole in the second handle portion half. A locking pin extends through the locking holes when not in use. The first and second locking holes are located between the apertures above and the gripping end below and in facing contact with each other to temporarily hold the system in the closed/locked orientation. The pivot portion also includes a coil spring with first and second free ends. The first free end is coupled to the first handle portion half. The second free end is coupled to the second handle portion half. The coil spring tends to move the brush portion to an open inoperative orientation.

Lastly, the brush portion includes similarly constructed first and second twisted wires. Each twisted wire has a loop distally and linear ends proximally. The linear end is coupled to the proximal ends of the handle portion coupling ends. Each loop is arcuate for between 270 and 360 degrees with a common side axis when viewed from the side. Each loop is arcuate for between 90 and 180 degrees with a front axis between the twisted wires when viewed from the front. Each loop is arcuate for between 90 and 180 degrees with parallel top axes spaced laterally from the twisted wires when viewed from above. Each loop has bristles 46 extending radially for 360 degrees from the loop of the brush portion to form a generally circular passageway for slidably receiving an extremity of a pet when the brush portion is in a closed orientation.

There has thus been outlined, rather broadly, the more important features of the invention in order that the detailed description thereof that follows may be better understood and in order that the present contribution to the art may be better appreciated. There are, of course, additional features of the invention that will be described hereinafter and which will form the subject matter of the claims attached.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of descriptions and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

It is therefore an object of the present invention to provide a new and improved interactive pet grooming/petting/massaging/tool/toy system which has all of the advantages of the prior art pet grooming tools and toy systems of known designs and configurations and none of the disadvantages.

It is another object of the present invention to provide a new and improved interactive pet grooming/petting/massaging/tool/toy system which may be easily and efficiently manufactured and marketed.

It is further object of the present invention to provide a new and improved interactive pet grooming/petting/massaging/tool/toy system which is of durable and reliable constructions.

An even further object of the present invention is to provide a new and improved interactive pet grooming/petting/massaging/tool/toy system which is susceptible of a low cost of manufacture with regard to both materials and labor, and which accordingly is then susceptible of low prices of sale to the consuming public, thereby making such interactive pet grooming/petting/massaging/tool/toy system economically available to the buying public.

Even still another object of the present invention is to provide an interactive pet grooming/petting/massaging/tool/toy system for brushing animal extremities and non-extremities, including tails, paws, legs, ears, backs, sides, bellies, jaws necks, and the like with various portions of the same brush in a safe, convenient and economical manner.

Lastly, it is an object of the present invention to provide a new and improved interactive pet grooming/petting/massaging/tool/toy system. A pivot portion is between a handle portion proximally and a brush portion distally. The brush portion has first and second twisted wires. Each twisted wire has a loop distally and linear ends proximally. The linear ends are coupled to the handle portion. Each loop is arcuate for between 270 and 360 degrees with a common side axis when viewed from the side. Each loop is arcuate for between 90 and 180 degrees with a front axis between the twisted wires when viewed from the front. Each loop is arcuate for between 90 and 180 degrees with parallel top axes spaced laterally from the twisted wires when viewed from above. Each loop has bristles extending radially for 360 degrees from the loop.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

The same reference numerals refer to the same parts throughout the various Figures.

DESCRIPTION OF THE PREFERRED EMBODIMENT

With reference now to the drawings, and in particular to FIGS. 1 through 5 thereof, the preferred embodiment of the new and improved interactive pet grooming/petting/massaging/tool/toy system embodying the principles and concepts of the present invention and generally designated by the reference numeral 10 will be described.

The present invention, the interactive pet grooming/petting/massaging/tool/toy system 10 is comprised of a plurality of components. Such components in their broadest context include a brush portion, a pivot portion, and a handle portion. Such components are individually configured and correlated with respect to each other so as to attain the desired objective.

The interactive pet grooming/petting/massaging/tool/toy system 10 of the present invention is for brushing animal extremities and non-extremities. The extremities include tails, paws, legs, ears and the like. The non-extremities include backs, sides, bellies, jaws, necks and other irregular surfaces. The brushing is done with various portions of the same brush in a safe, convenient and economical manner.

Provided are a handle portion proximally 16, a pivot portion 18 centrally, and a brush portion 14 distally.

The handle portion 16 has similarly configured first and second halves. Each half has a coupling end 22 adapted to couple to the brush portion. Each half also has a gripping end 24 adapted to be gripped by a user for opening and closing and manipulating the brush portion. Each half has an aperture 26 extending centrally there through. Note FIG. 4. The apertures are in axial alignment. Each gripping end also includes a first closed hand ring 28 in an oval shaped. Each gripping end also includes a second closed hand ring 30 in a generally oval shape with a concave portion adjacent to the first closed hand ring.

Figure 1:
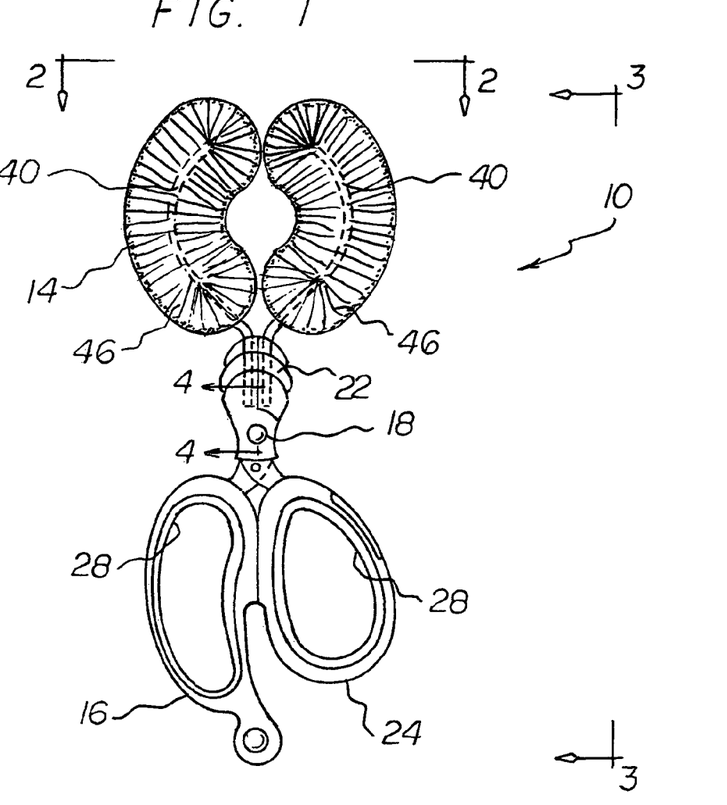
FIG. 1 is a front elevational view of an interactive pet/petting/massaging/tool/toy system constructed in accordance with the principles of the present invention, the system being shown in a closed orientation.
Figure 2:
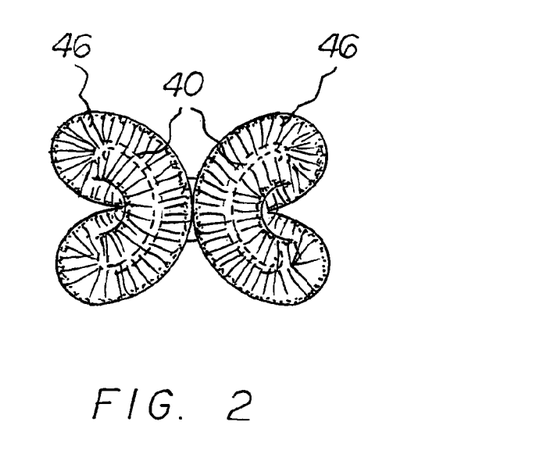
FIGS. 2 and 3 are plan and side elevational views taken along lines 2-2 and 3-3 of FIG. 1.
Figure 3:
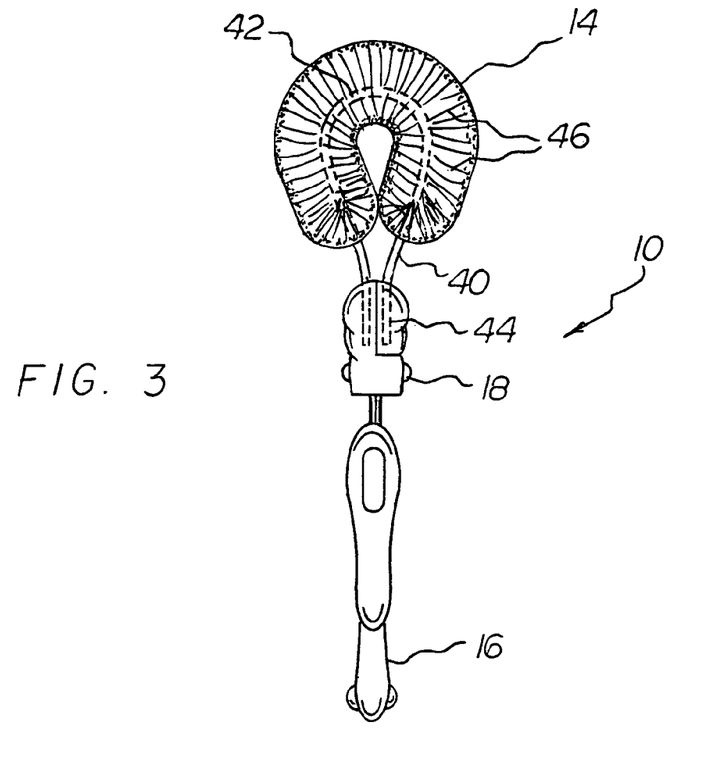
Figure 4:
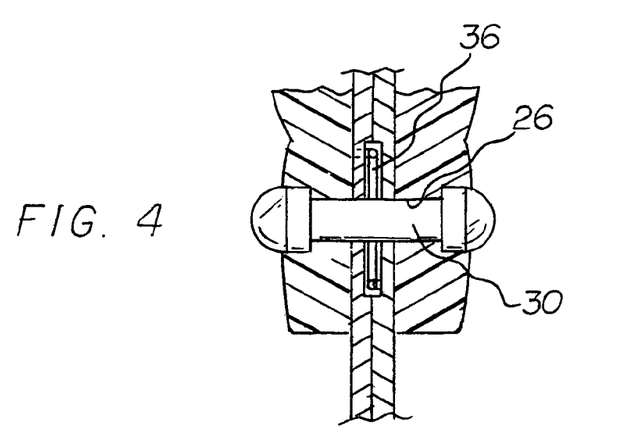
FIG. 4 is a cross sectional view through the pivot region of the handle portion.
Figure 5:
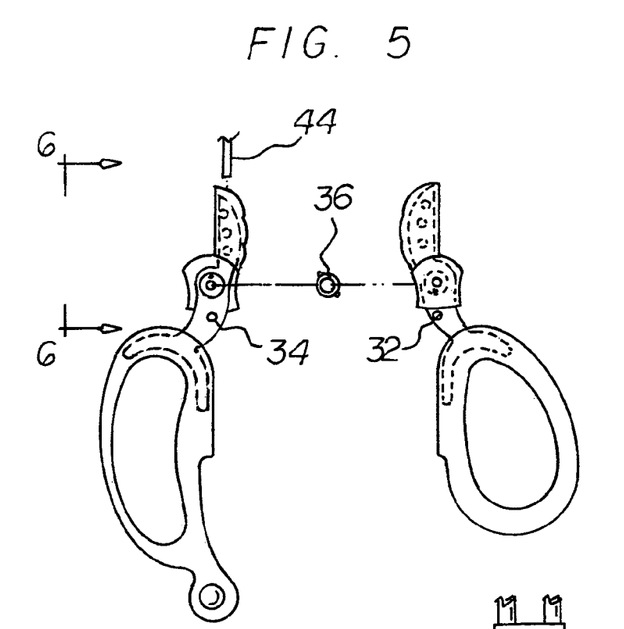
FIG. 5 is an exploded front elevational view of the pivot region of FIGS. 1-4.
Figure 6:
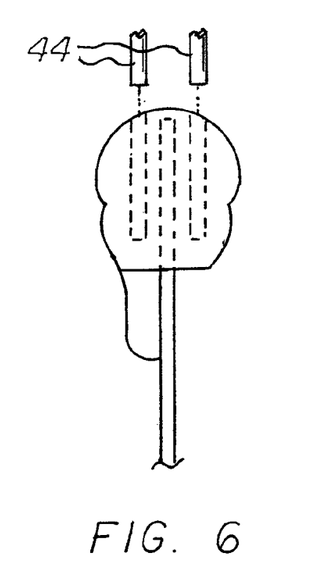
FIG. 6 is an exploded side elevational view of the brush-to-handle coupling region of FIGS. 1-5.

The pivot portion 18 includes a pivot pin 30 extending through the apertures to guide the gripping ends when oscillated by a user to move the brush portion between an inoperative open orientation and an operative closed orientation. The pivot portion also includes a first locking hole 32 on the first handle portion half and a second locking hole 34 in the second handle portion half. A locking pin extends through the first and second locking holes when not on use. The first and second locking holes are located between the apertures above and the gripping end below and in facing contact with each other to temporarily hold the system in the closed orientation. The pivot portion also includes a coil spring 36 with first and second free ends. The first free end is coupled to the first handle portion half. The second free end is coupled to the second handle portion half. The coil spring tends to move the brush portion to an open inoperative orientation.

Lastly, the brush portion 14 includes similarly constructed first and second twisted wires 40. Each twisted wire has a loop 42 distally and linear ends 44 proximally. The linear end is coupled to the proximal ends of the handle portion coupling ends. Each loop is arcuate for between 270 and 360 degrees with a common side axis when viewed from the side. Note FIG. 3. Each loop is arcuate for between 90 and 180 degrees with a front axis between the twisted wires when viewed from the front. Note FIG. 1. Each loop is arcuate for between 90 and 180 degrees with parallel top axes spaced laterally from the twisted wires when viewed from above. Note FIG. 2. Each loop has bristles 46 extending radially for 360 degrees from the loop of the brush portion to form a generally circular passageway for slidably receiving an extremity of a pet when the brush portion is in a closed orientation.

Figure 7:
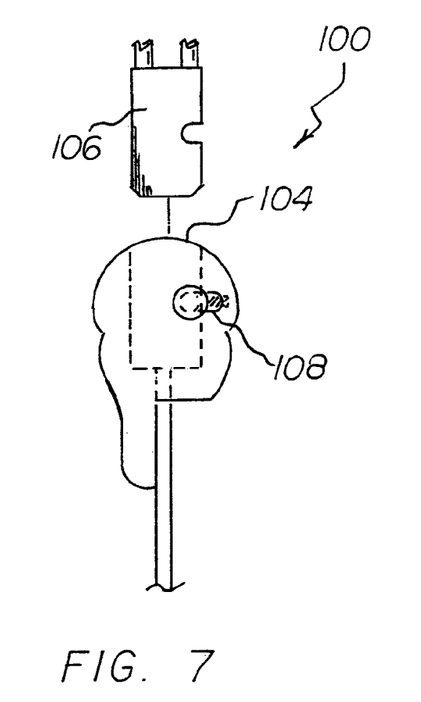
FIG. 7 is an exploded side elevational view of the brush-to-handle coupling region constructed in accordance with an alternate embodiment of the invention.

An alternate embodiment of the system 100 is shown in FIG. 7. In this embodiment, the coupling ends of the first and second halves of the handle portion are each formed with a recess 104. This embodiment also includes a block 106 removably received in an associated recess. Each block receives the linear ends of an associated twisted wire. Set screws 108 are provided. Each set screw removably secures one of the blocks in an associated recess for facilitating the changing of the brush portions.

Figure 8:
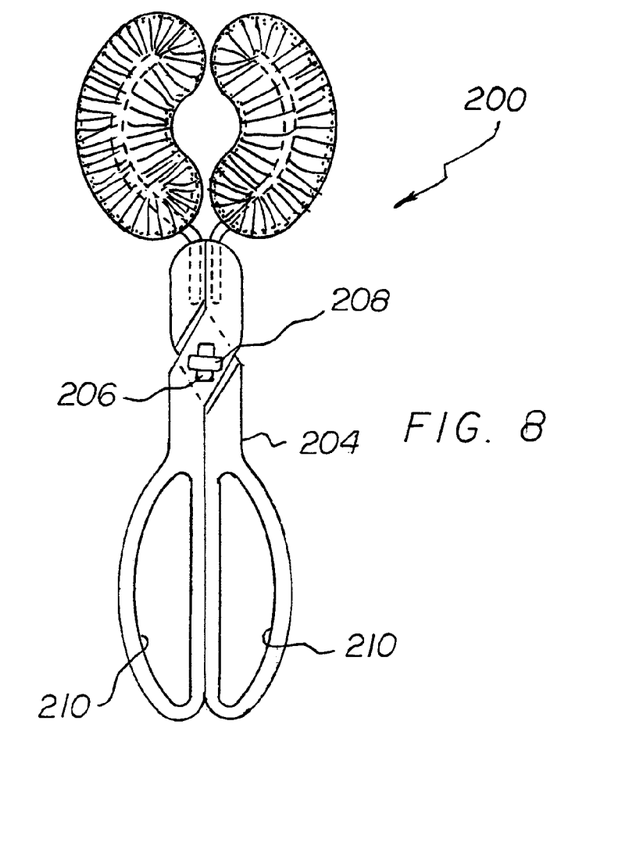
FIG. 8 is a front elevational view of a grooming/petting/massaging/tool/toy system similar to FIG. 1 but constructed in accordance with another alternate embodiment of the invention.
Figure 9:
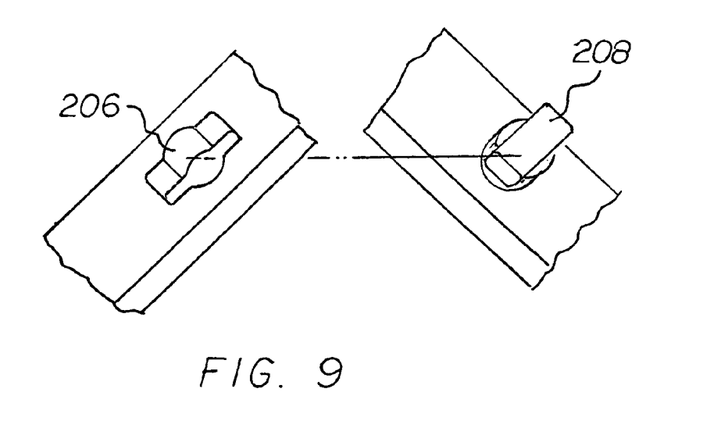
FIG. 9 is an exploded front elevational view of the pivot region of FIG. 8.

A further alternate embodiment of the system 200 is shown in FIGS. 8 and 9. In this embodiment, the handle portion 204 has similarly configured first and second halves. Each half has a coupling end. Each half also has a gripping end adapted to be gripped by a user for opening and closing and manipulating the brush portion. In this embodiment, the pivot portion includes an opening 206 in the first half extending centrally there through. The pivot portion includes a projection 208 in the second half extending centrally there from. The opening removably receives and pivotally supports the projection to facilitate the moving of the system between the open and closed orientations. The gripping end includes a first and second closed hand rings 210, each in a D-shaped configuration with a curved extent and a linear extent.

Figures 10, 11:
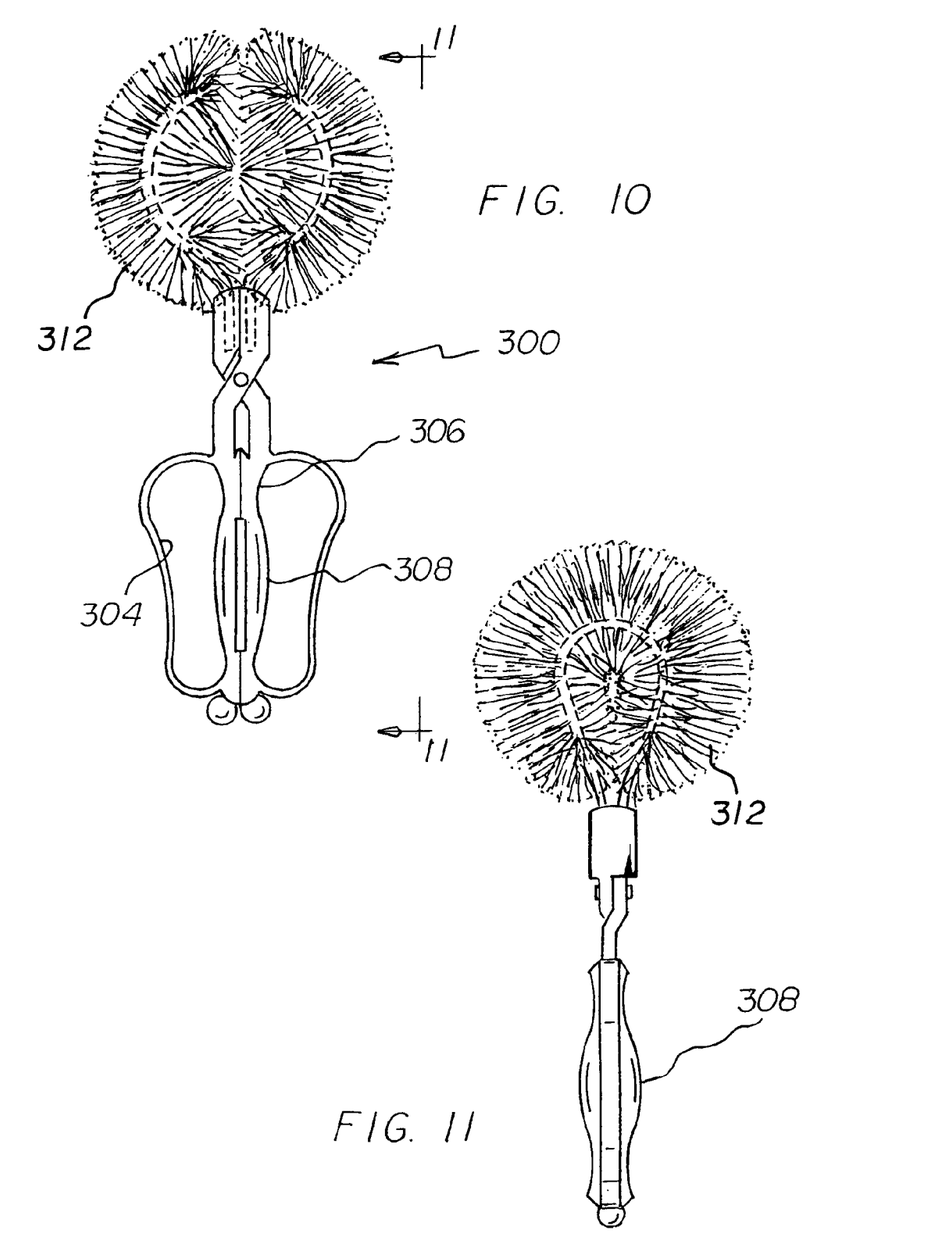
FIG. 10 is a front elevational view of a grooming/petting/massaging/tool/toy system similar to FIGS. 1 and 8 but constructed in accordance with a final alternate embodiment of the invention.
FIG. 11 is a side elevational view waken along line 11-11 of FIG. 10.

A final alternate embodiment of the system 300 is shown in FIGS. 10 and 11. In this embodiment, the handle portion has similarly configured first and second halves. Each half has a coupling end. Each half also has a gripping end adapted to be gripped by a user for opening and closing and manipulating the brush portion. The gripping end includes a first closed hand ring 304 in a generally hour glass shape and a second closed hand ring 306 in a generally hour glass shape. The rings each include interior edges 308 of an enlarged cross sectional configuration.

The interactive pet grooming/petting/massaging/tool/toy system 300 of FIGS. 10 and 11 also includes bristles 312 which are of an extended length. This provides a generally spherical configuration at the brush portion with the bristles of the first twisted wire in contact with the bristles of the second twisted wire along the entire lengths of the twisted wires when in the closed orientation.

The interactive pet grooming/petting/massaging/tool/toy system of the present invention, a "brush fur fun", is an interactive system. It is specifically designed for the tail, legs, paws and ears of dogs, cats and horses or other farm or house pets. The brush portions for the dogs and cats and horses are all the exact same shape, ball shaped when closed, semi-circular when open. They will, however, be of different sizes; small, medium and large, due to animal size differences. The handles are adapted to be of any of a plurality of grip configurations.

Although the present invention is specifically designed for the tail, legs, paws and ears, it is perfectly suited for backs, sides, bellies, jaws necks and other irregular surfaces because of its unique ball-shaped design. The present invention preferably has a spring loaded handle that opens and closes. When closed, it is a circular round shaped/spherical brush. When opened, it is a circular brush that consists of two semi-circular spheres. The two semi-circular brushes are placed around the bases of the extremities, the tail, legs, paws or ears, and closed together with a scissors-like spring loaded handle to form a circular brush around the extremity in order to brush, fluff, clean, groom, pet, massage and comb the entire circumference of that body part with one stroke. Cats and dogs love it. This "brush fur fun", the pet grooming system of the present invention, is an interactive brush/toy. It is a great bonding grooming/petting/massaging/tool/toy system.

In order to use the grooming brush of the present invention, the brush is opened and placed around the base of the tail or limb. The brush is then closed by bringing the handles together so that the brush completely encircles the base of the tail or limb. A user can manually apply any desired pressure around the tail or limb. The brush is then drawn along the tail or limb towards its extremity, with the bristles cleaning, brushing, petting, massaging, combing, and fluffing the hair on the tail, limb, or paw. The brush can be opened by releasing the handles and the process is repeated as often as desired to fluff the limb or tail of an animal.

The present invention allows the user to operate the "brush fur fun" at non-expected and non-obvious angles, positions and configurations. The user's hand is not restricted to facing parallel to the surface being brushed. The hand/brush can be rotated at multiple angles and degrees in order to brush any area or part of the pet's body because of its round shape.

The present invention may also be used on any cylindrical object to brush/scrape/sand/paint the surface of the cylindrical object or to apply a substance to its surface. The brush would be used by moving it back and forth along the length of the cylindrical object. For example, the circular brush may be used by placing it around a pole as described above to clean or scrape the pole, the brushes having bristles suited for this particular purpose. In addition, the circular brush may be used by placing it around a pole to apply a cleaning material or paint and the like, the bristles suited for this particular purpose.

In an alternate embodiment, the present invention may be constructed so that brush semi-circles are brought together to form a circular brush when the handles are brought apart. In this case, the arms are biased to maintain brushes in a closed position when handles are not brought together. The remaining elements of the brush or comb would be as described above.

As to the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by Letters Patent of the United States is as follows:

1. An interactive pet grooming/petting/massaging/tool/toy system comprising:
    a brush portion distally and a handle portion proximally and a pivot portion centrally, the brush portion including first and second twisted wires, each twisted wire having a loop distally and linear ends proximally, the linear ends coupled to the handle portion, each loop being arcuate for between 270 and 360 degrees with a common side axis when viewed from the side, each loop being arcuate for between 90 and 180 degrees with a front axis between the twisted wires when viewed from the front, each loop being arcuate for between 90 and 180 degrees with parallel top axes spaced laterally from the twisted wires when viewed from the above, each loop having bristles extending radially for 360 degrees from the loop.

2. The system as set forth in claim 1 wherein the handle portion has similarly configured first and second halves, each half having a coupling end and a gripping end, the gripping ends adapted to be gripped by a user for opening and closing and manipulating the brush portion, each half having an aperture extending centrally there through, the apertures being in axial alignment, the gripping end also including a first closed hand ring in an oval shape, a second closed hand ring in a generally oval shape with a concave portion adjacent to the first closed hand ring.

3. The system as set forth in claim 2 wherein the pivot portion includes a pivot pin extending through the apertures to guide the gripping ends when oscillated by a user to move the brush portion between an inoperative open orientation and an operative closed orientation.

4. The system as set forth in claim 3 wherein the pivot portion further including a dimple projection on the first handle portion half and a dimple recess in the second handle portion half, the dimple projection and dimple recess being located between the apertures above and the gripping end below and in facing contact with each other to temporarily hold the system in the closed orientation.

5. The system as set forth in claim 1 wherein the pivot portion also includes a coil spring with first and second free ends, the first free end coupled to the first handle portion half, the second free end coupled to the second handle portion half, the coil spring tending to move the brush portion to the operative orientation.

6. The system (100) as set forth in claim 1 wherein the handle portion is formed with first and second halves, each half being formed with a recess (104), the system further including a block (106) removably received in an associated recess, each block receiving the linear ends of an associated twisted wire, the system further including a set screw (108) for removably securing each block in an associated recess for facilitating the changing of the brush portions.

7. The system (200) as set forth in claim 1 wherein the handle portion (204) has similarly configured first and second halves, each half having a coupling end and a gripping end adapted to be gripped by a user for opening and closing and manipulating the brush portion, the pivot portion including an opening (206) in the first half extending centrally there through, the pivot portion including a projection (208) in the second half extending centrally there from, the opening removably receiving and pivotally supporting the projection to facilitate the moving of the system between the open and closed orientations.

8. The system (200) as set forth in claim 1 wherein the handle portion has similarly configured first and second halves, each half having a coupling end and a gripping end adapted to be gripped by a user for opening and closing and manipulating the brush portion, the gripping end including a first and second closed hand rings (210), each in a D-shaped configuration with a curved extent and a linear extent.

9. The system (300) as set forth in claim 1 wherein the handle portion has similarly configured first and second halves, each half having a coupling end and a gripping end adapted to be gripped by a user for opening and closing and manipulating the brush portion, the gripping end including a first closed hand ring (304) in a generally hour glass shape, a second closed hand ring (306) in a generally hour glass shape, the rings each including interior edges (308) of an enlarged cross sectional configuration.

10. The system (300) as set forth in claim 1 wherein the bristles (312) are of an extended length to provide a generally spherical configuration at the brush portion with the bristles of the first twisted wire in contact with the bristles of the second twisted wire along the entire lengths of the twisted wires when in a closed orientation.

11. An interactive pet grooming/petting/massaging/tool/toy system (10) for brushing animal extremities and non-extremities, the extremities including tails, paws, legs, ears and the like, the non-extremities including backs, sides, bellies, jaws necks and other irregular surfaces, the brushing being done with various portions of the same brush in a safe, convenient and economical manner, the system comprising, in combination:
    a brush portion (14) distally and a handle portion (16) proximally and a pivot portion (18) centrally;
    the handle portion (16) having similarly configured first and second halves, each half having a coupling end (22) adapted to couple to the brush portion and a gripping end (24), the gripping ends adapted to be gripped by a user for opening and closing and manipulating the brush portion, each half having an aperture (26) extending centrally there through, the apertures being in axial alignment, the gripping end also including a first closed hand ring (28) in an oval shape, a second closed hand ring (28) in a generally oval shape with a concave portion adjacent to the first closed hand ring;

the pivot portion (18) including a pivot pin (30) extending through the apertures to guide the gripping ends when oscillated by a user to move the brush portion between an inoperative open orientation and an operative closed orientation, the pivot portion also including a first locking hole (32) on the first handle portion half and a second locking hole (34) in the second handle portion half, a locking pin extends through the locking holes when not in use, the first and second locking holes being located between the apertures above and the gripping end below and in facing contact with each other to temporarily hold the system in the closed/locked orientation, the pivot portion also including a coil spring (36) with first and second free ends, the first free end coupled to the first handle portion half, the second free end coupled to the second handle portion half, the coil spring tending to move the brush portion to an open inoperative orientation; and the brush portion (14) including similarly constructed first and second twisted wires (40), each twisted wire having a loop (42) distally and linear ends (44) proximally, the linear ends coupled to the proximal ends of the handle portion coupling ends, each loop being arcuate for between 270 and 360 degrees with a common side axis when viewed from the side, each loop being arcuate for between 90 and 180 degrees with a front axis between the twisted wires when viewed from the front, each loop being arcuate for between 90 and 180 degrees with parallel top axes spaced laterally from the twisted wires when viewed from the above, each loop having bristles (46) extending radially for 360 degrees from the loop of the brush portion to form a generally circular passageway for slidably receiving an extremity of a pet when in a closed orientation.

\* \* \* \* \*